United States Patent
Blaschke et al.

(10) Patent No.: US 6,631,655 B2
(45) Date of Patent: Oct. 14, 2003

(54) SHIFTER FOR ACTUATING THE GEAR MECHANISM OF A BICYCLE

(75) Inventors: Georg Blaschke, Geldersheim (DE); Marcus Auer, Schwebheim (DE)

(73) Assignee: SRAM Deutschland GmbH (DE)

(*) Notice: Subject to any disclaimer, the term of this patent is extended or adjusted under 35 U.S.C. 154(b) by 59 days.

(21) Appl. No.: 09/785,779

(22) Filed: Feb. 16, 2001

(65) Prior Publication Data

US 2001/0023621 A1 Sep. 27, 2001

(30) Foreign Application Priority Data

Feb. 18, 2000 (DE) .......................... 100 07 592

(51) Int. Cl.[7] ................................ G05G 5/08
(52) U.S. Cl. .................. 74/502.2; 74/529; 74/473.14; 74/473.28
(58) Field of Search .................. 74/473.14, 473.21, 74/473.28, 502.2, 529, 535–538, 527, 532, 540, 541, 575–578

(56) References Cited

U.S. PATENT DOCUMENTS

| | | | |
|---|---|---|---|
| 2,534,566 A | | 12/1950 | Yapp |
| 3,915,029 A | * | 10/1975 | Shimada .................. 74/502.2 |
| 3,943,794 A | * | 3/1976 | Shimada ................ 74/501.5 R |
| 3,972,247 A | * | 8/1976 | Armstrong ................... 74/489 |
| 4,155,270 A | * | 5/1979 | Juy .......................... 74/473.13 |
| 4,658,667 A | * | 4/1987 | Schuller ................. 74/473.14 |
| 4,864,885 A | * | 9/1989 | Nagano ..................... 74/502.2 |
| 4,876,913 A | * | 10/1989 | Romano ..................... 74/535 |
| 5,044,213 A | * | 9/1991 | Nagano ....................... 74/142 |
| 5,213,005 A | * | 5/1993 | Nagano, Masashi ....... 74/502.2 |
| 5,489,246 A | * | 2/1996 | Moody et al. ........... 192/220.2 |
| 5,615,580 A | * | 4/1997 | Chen et al. .............. 74/473.13 |
| 5,775,166 A | * | 7/1998 | Osborn et al. ................. 74/527 |
| 5,785,626 A | * | 7/1998 | Osborn et al. ........... 74/473.15 |
| 5,816,111 A | * | 10/1998 | Borchers ..................... 74/535 |
| 5,901,973 A | * | 5/1999 | Warren ..................... 280/728.3 |

FOREIGN PATENT DOCUMENTS

| | | |
|---|---|---|
| CH | 248670 A | 5/1947 |
| DE | 843212 C | 7/1952 |
| DE | 1 033 063 | 6/1958 |
| DE | 3501951 A1 | 7/1986 |
| DE | 3809243 A1 | 10/1988 |
| GB | 498820 | 1/1939 |
| GB | 649009 | 1/1951 |

* cited by examiner

*Primary Examiner*—Chong H. Kim
(74) *Attorney, Agent, or Firm*—Milan Milosevic; Lisa Wunderlich

(57) ABSTRACT

The invention relates to a shifter for actuating at least one gear mechanism of a bicycle including a housing, a gripping element for actuating the shifter, and a movable element for exerting tension on and/or for releasing a gear transfer means. The movable element has a pawl which engages in a set of latching teeth in the housing. The gripping element has a lifter which disengages the pawl from the latching teeth during a shifting operation in the release direction. A driver on the gripping part preloads a spring on the movable element during a shifting operation in the release direction which urges the movable element in the release direction. The advantage of a shifter for bicycle gear mechanisms according to the present invention is to be found in that, by simple means, it becomes possible to shift gears, especially in the release direction, quickly and independently of the preload being exerted on the movable element by the gear mechanism via the transfer element.

12 Claims, 3 Drawing Sheets

SHIFTER FOR ACTUATING THE GEAR MECHANISM OF A BICYCLE

BACKGROUND OF THE INVENTION

1. Field of the Invention

The invention relates to a shifter for actuating at least one gear mechanism of a bicycle.

2. Description of the Related Art

German Patent Application P 3 501 951.4 describes a shifting device for a multi-stage gear mechanism of a bicycle in which a shift lever is mounted with freedom to pivot on a journal pin attached to a housing. A central section of the shift lever is designed as a winding drum for the shift-control cable. The central section of the shift lever is also provided with latching stages for engagement with a latching pawl mounted on the base part of the shifter so that it can swing in the radial direction. The latching pawl is under the influence of the restoring force of the tensioned shift-control cable and is additionally provided with its own spring element which urges the latching pawl to swing outward. The advantages of a shifting device designed in this way are that it requires only a few parts which are easy and simple to manufacture and that it offers good functionality at low production cost. A problem with this shifting device is that there are certain limitations on its functionality, because delays can occur in the shifting operation when a problem in the gear hub, for example, prevents the gears from shifting easily from one stage to another. When that occurs, the influence of the restoring force of the tensioned shift-control cable disappears for a short time and the shift lever is unable to exert any effect for that short time.

British Patent No. GB 2,012,893 A discloses a shifter for bicycle gears designed as a step-type or trigger shifter which establishes the individual gear positions using pawls which may be used both to shift and also to hold the selected gear. This is a two-lever shifter, in which a first shift lever exerts tension on a control cable in the tensioning direction and a first pawl rotates a winding drum on which the control cable is wound by engaging with a set of latching teeth. The control cable is released to move in the release direction by a second lever which lifts a second pawl out of a second set of latching teeth and releases the control cable in a series of steps according to the principle of a balance wheel in a mechanical watch. Two pawls and two shifters are required to execute these relatively simple shifting operations in the two directions. This shifter is complicated and it still does not have a design which can be considered optimal in terms of ergonomic usability.

SUMMARY OF THE INVENTION

The proposed shifter according to the present invention consists essentially of only three parts which are easy to manufacture by the injection-molding process. In this shifter, a transfer means is attached to a movable element, which can either tension or release the transfer means. This movable element is supported together with a gripping element in a housing with the freedom to pivot around a center of rotation in the housing. A pawl on the movable element engages with a set of latching teeth in the housing and in this way defines the individual gear positions of the gear mechanism of the bicycle. A spring is also connected to the gripping element. The spring works together with the gripping element such that the transition from one latching stage to another acquires an initial acceleration in the release direction of the transfer means. This speeds up the shifting operation in the release direction and increases the preload on the transfer means normally provided by the gear mechanism. This is because the pawl of the movable element is not raised by the lifter on the gripping element until the spring has been able to exert a certain amount of preload on the movable element. As a result of this preload, the mechanism is then able to arrive at the next gear position at an accelerated rate.

The object of the present invention is therefore to create a shifter which consists of only a few, easily made parts, which is easy to shift both in the tensioning direction and in the release direction, and which makes it possible for the tensioning means to change from a first to a second gear position of the gear mechanism at an accelerated rate in particular in the release direction.

The object is met by a shifter for actuating at least one gear mechanism of a bicycle including a housing having a set of latching teeth, a gripping element arranged on the housing and selectively moveable relative to the housing in a release direction and a tensioning direction for actuating the shifter, and a movable element movably arranged on the housing and connectable to a gear transfer means for tensioning and releasing the gear transfer means. The movable element includes a pawl operatively arranged for engaging the set of latching teeth arranged on the housing. A lifter is arranged on the gripping element operatively arranged for disengaging the pawl from the set of latching teeth when the gripping element is moved in the release direction. A spring is arranged on the movable element and a driver is mounted on the gripping element. The driver is operatively arranged for preloading the spring when the gripping element is moved in the release direction for urging the movable element toward the release direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
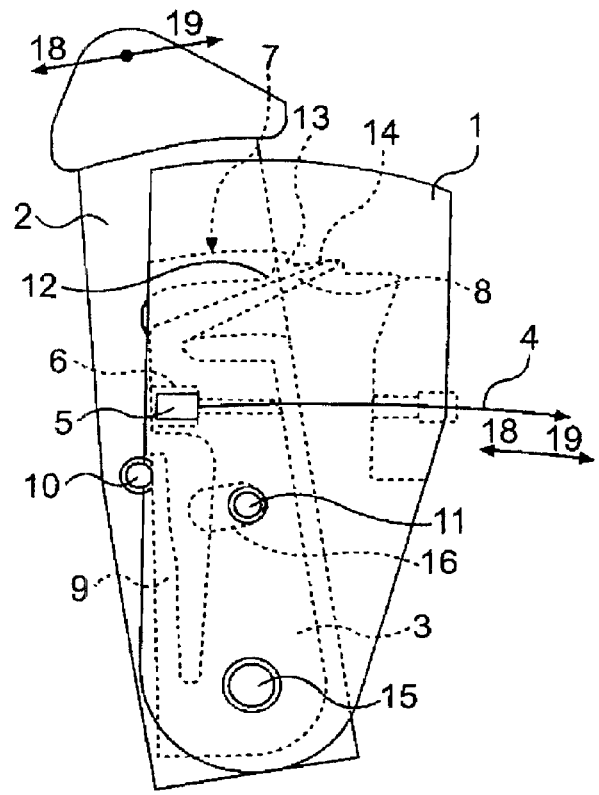
FIG. 1 is a plan view of a shifter according to an embodiment of the present invention including a housing, a gripping element, and a movable element.
Figure 2:
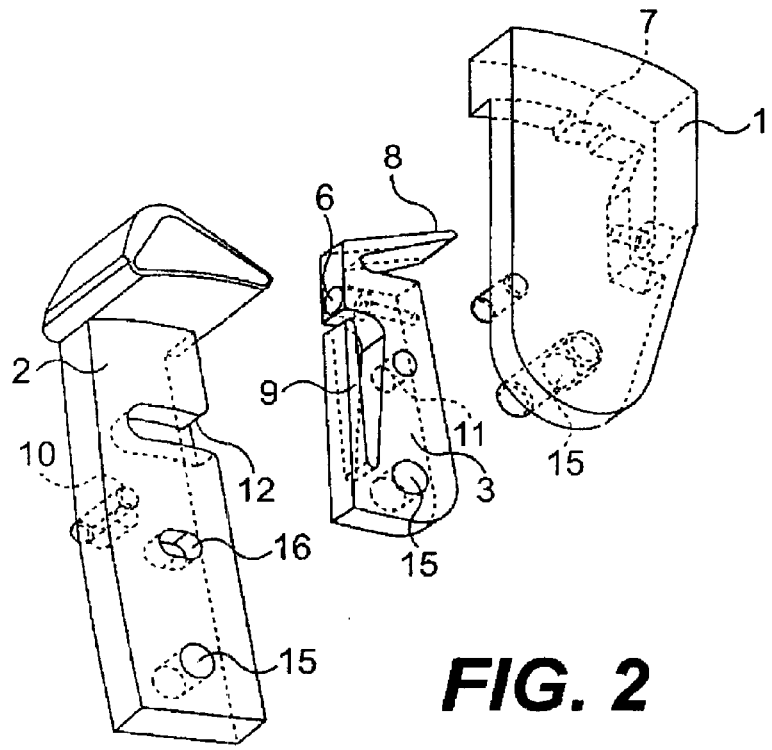
FIG. 2 is a perspective exploded view showing the three parts of FIG. 1, where a spring and a pawl are connected integrally to the movable element.
Figure 2A:
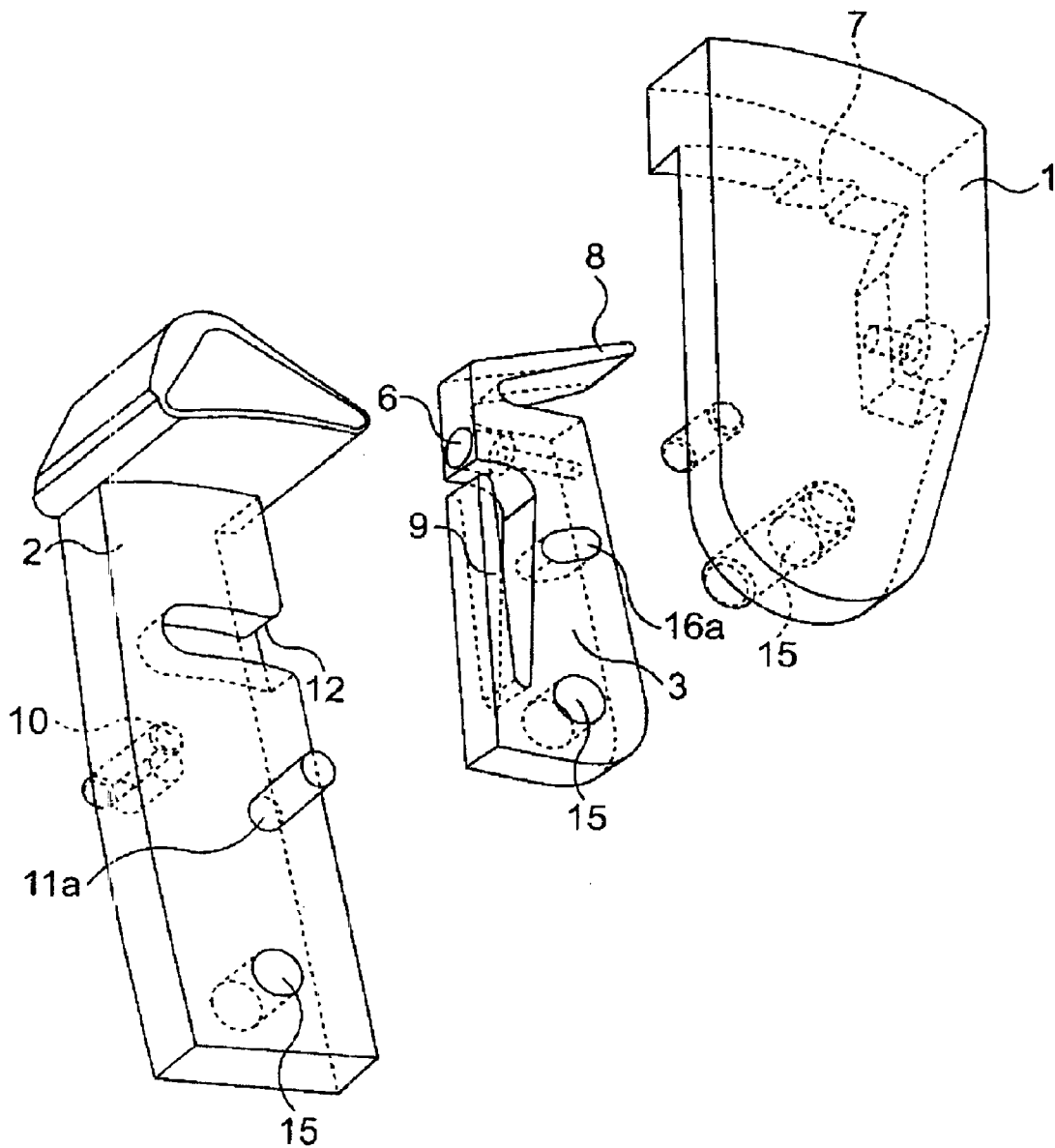
FIG. 2a is a perspective exploded view of an alternative embodiment according to the present invention.

FIGS. 1 and 2 show a shifter for actuating the gear mechanism of a bicycle according to an embodiment of the present invention. This shifter includes a housing 1 which may be used to mount the shifter on the bicycle. A gripping element 2 and a movable element 3 are arranged on the housing 1 such that the gripping element 2 and movable element 3 are pivotably supported with freedom to pivot about a center of rotation 15. The movable element 3 has a receptacle 6, in which the nipple or end casting 5 of a gear transfer means 4 is held. The gear transfer means 4 is connected to a bicycle gear mechanism (not shown) for controlling the gear stages thereof. When the movable element 3 moves in the tensioning direction 18, the end casting 5 and the gear transfer means 4 which controls the change of shift positions in the bicycle gear mechanism are carried along with it. The gear transfer means 4 is preloaded by a spring (not shown) in the gear mechanism, so that the end casting 5 in the receptacle 6 of the movable element 3 generates a force on the receptacle 6. This forces urges the movable element 3 to rotate about the center of rotation 15 in a release direction 19. This rotation of the movable element 3 in the release direction is prevented by a pawl 8 arranged on the movable element 3 which engages with and is held by a set of latching teeth 7 in the housing 1. Accordingly, an equilibrium of forces act between the gear mechanism and the shifter across the pawl 8 and the latching teeth 7. The gripping element 2 is operable to change this equilibrium. That is, the gripping element 2 is connected to the movable element 3 by a stop 11 which is arranged on the movable element 3. The stop 11 engages with a retaining profile 16 on the gripping element 2. When the pawl 8 is to be pushed in the tensioning direction 18 along the set of latching teeth 7, the gripping element 2 moves until the stop 11 comes to rest against the retaining profile 16. Then continued movement of the gripping element causes the retaining profile 16 to carry the stop 11 and the movable element 3 together with pawl 8 along with it, so that the pawl 8 is pushed farther along the latching teeth 7 in the tensioning direction. Of course, the arrangement of the retaining profile 16 and the stop 11 may be reversed so that a retaining profile 16a is arranged on the movable element 3 and a stop 11a is arranged on the gripping element 2 as shown in FIG. 2a.

Referring again to FIGS. 1 and 2, the gripping element 2 is also connected to the movable element 3 by a driver 10 arranged on the gripping element 2. The driver 10 cooperates with a spring 9 mounted on the movable element 3. The spring 9 is held under a certain preload by the driver 10 so that when the movable element 3 remains at rest, the gripping element 2 is urged in the tensioning direction 18 by the driver 10 under the force of the spring 9 until the stop 11 rests against the retaining profile 16. When this has happens, the gripping element 2 is now also in its rest position. If actuation of the gear mechanism of the bicycle involving movement of the gripping element 2 in the release direction 19 is desired, the pawl 8 must be disengaged to allow the movable element 3 to move in the release direction 19 along the latching teeth 7. The gripping element 2 is therefore provided with a lifter 12, which works together with the pawl 8 and disengages it when the gripping element 2 is moved in the release direction 19. Before the pawl 8 is lifted out of its position on the retaining surface 13 of the latching teeth 7, the driver 10 is pushed against the spring 9 of the movable element 3. Accordingly, the spring 9 is put under a certain amount of pretension which preloads the movable element 3 in the release direction. As soon as the lifter 12 has lifted the pawl 8 out of its position on the retaining surface 13, the movable element 3 is pushed against the driver 10 and in to the next latching position on the latching teeth 7 by both the preload being exerted by the gear mechanism of the bicycle via the transfer means 4 and by the preload of the spring 9. The spring 9 of the movable element 3 relaxes and restores the gripping element 2 to its previously described rest position after the shift has been completed to the next position on latching teeth 7 and the stop 11 comes to rest against the retaining profile 16.

Figure 3:
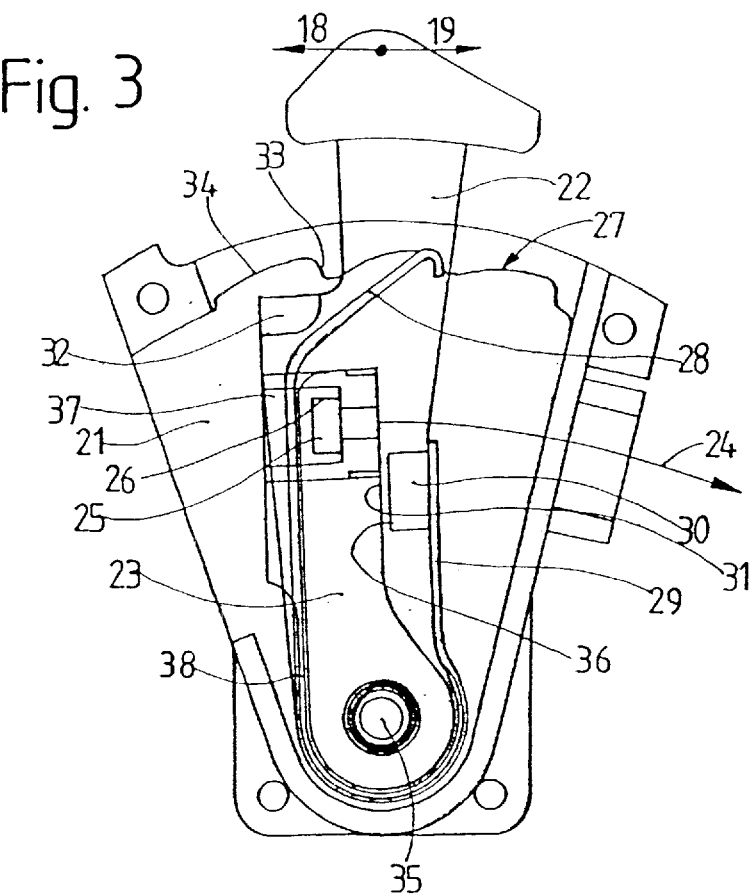
FIG. 3 is a plan view of a shifter according to another embodiment of the present invention with a movable element surrounded by a spring element.
Figure 4:
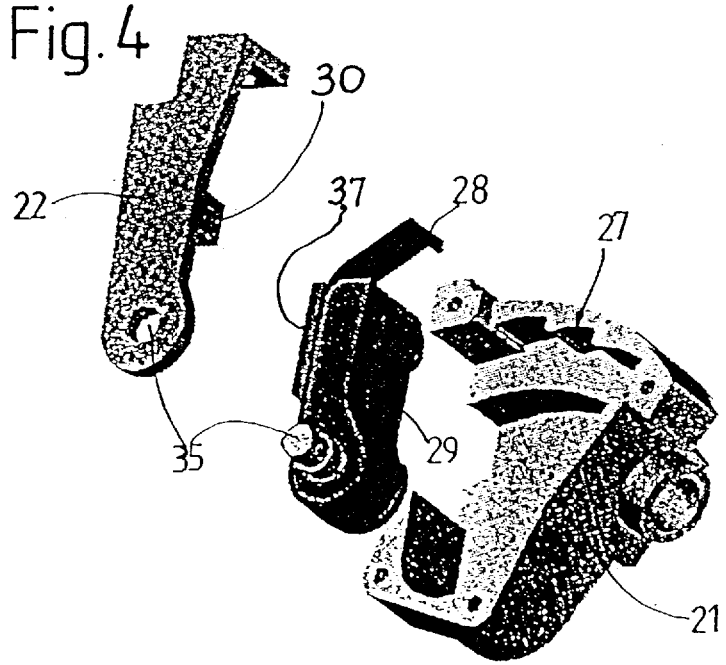
FIG. 4 is a perspective exploded view of the shifter of FIG. 3 showing the individual parts.

FIGS. 3 and 4 illustrate another embodiment of a shifter according to the present invention which functions in approximately the same way as the shifter according to FIGS. 1 and 2. The shifter of FIGS. 3 and 4 has a spring element 38 to replace the pawl 8 and the spring 9. A housing 21, a gripping element 22, and a movable element 23 of this embodiment are joined by a fourth element, namely, the spring element 38. The advantage of using a spring element 38 instead of molded-on pawl 8 and a spring 9 lies the greater reliability of the shifter, which must remain in good operating condition even under extreme conditions. The gripping element 22 and the movable element 23 are supported in the housing 21 with freedom to pivot around a common center of rotation 35. A transfer means 24 with a nipple or end casting 25 is held in a receptacle 26 of the movable element 23. Just as the housing 1 according to FIG. 1 has a set of latching teeth 7 with the retaining surface 13 and a travel surface 14, the housing 21 also has a set of latching teeth 27 with a retaining surface 33 and a travel surface 34 with which a pawl 28 engages. The pawl 28 is an integral part of the spring element 38. The spring element 38 passes down and around the center of rotation 35 and thus surrounds the movable element 23 so that the other end of the spring element 38 function as a spring 29 for connecting the movable element 23 to the gripping element 22 via a driver 30. As in the case of the stop 11 in the shifter according to FIG. 1, a lateral surface of the movable element 23 serves here as the stop 31, against which a retaining profile 36 rests when the gripping element 22 is moved in the tensioning direction. The spring 29 rests against the driver 30 under preload and brings the gripping element 22 into a rest position as the retaining profile 36 of the driver 30 comes to rest against the stop 31. The spring element 38 has a shape which conforms to the movable element 23 both in the area where it passes around the center of rotation and also in the area where it leaves the movable element 23 to become the pawl 28. In that area of the movable element 23, a retaining rib 37 is operatively arranged to form a groove in which the spring element 38 is inserted. The flanks of the groove are formed by the movable element 23 itself and by the retaining rib 37.

If the rider of the bicycle now wants to shift in the tensioning direction 18, he or she will move the gripping element 22 in the tensioning direction 18, as a result of which the retaining profile 36 of the driver 30 on the gripping element 22 pushes against the stop 31 on the movable element 23 and thus pivots the movable element 23 until the pawl 28 of the spring 38 has traveled far enough along the travel surface 34 to reach the next desired retaining surface 33 of the latching teeth 27. The spring 29 is preloaded such that the rest position of the gripping element 22 is reached when the retaining profile 36 of the driver 30 rests against the stop 31. During a shift in the release direction 19, the gripping part 22 is moved in the appropriate direction and a lifter 32 attached to the gripping part 22 pushes against the pawl 28 and tries to lift it out of its position from the retaining surface 33 of the latching teeth 27.

Before this happens, the spring 29 is preloaded by the driver 30 so that a rotational force is transferred to the movable element 23. As in the case of the shifter according to FIG. 1, this force acting in the release direction 19 includes both the preload itself and the preload being exerted via the transfer means 24 by the gear mechanism of the bicycle. As the gripping part 22 continues to move in the release direction 19, the pawl 28 is finally lifted out completely and abruptly transported via the travel surface 34 to the next retaining surface 33.

The advantage of a shifter according to the present invention for bicycle gear mechanisms is that, by simple means, it is possible to shift gears, especially in the release direction 19, quickly and independently of the preload being exerted by the gear mechanism on the movable element 3, 23 via the transfer element 4, 24.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A shifter for actuating at least one gear mechanism of a bicycle, comprising:
    a housing having a set of latching teeth;
    a gripping element arranged on said housing and selectively moveable relative to said housing in a release direction and a tension direction for actuating the shifter;
    a movable element movably arranged on said housing and directly connected to a gear transfer means for tensioning and releasing the transfer means, said movable element including a pawl operatively arranged for engaging said set of latching teeth and configured to permit rotation in a first one of the release and tension directions and configured to be disengaged to permit rotation in a second one of the release and tension directions;
    a lifter arranged on said gripping element operatively arranged for disengaging said pawl from said set of latching teeth when said gripping element is moved in said release direction; and
    a spring arranged on said movable element and a driver mounted on said gripping element operatively arranged for preloading said spring when said gripping element is moved in said release direction for urging said movable element toward the release direction.

2. The shifter of claim 1, wherein each of said gripping element and said movable element is pivotally mounted in said housing with freedom to pivot around a common center of rotation.

3. The shifter of claim 1, further comprising a retaining profile arranged on said gripping element next to said driver and a stop arranged on said movable element.

4. The shifter of claim 3, wherein said retaining profile comprises an opening in said gripping element and said stop of said movable element engages said opening.

5. The shifter of claim 4, wherein at least one of said spring and said pawl are connected integrally to said movable element.

6. The shifter of claim 3, wherein said retaining profile comprises a surface on said driver against which said stop on said movable element rests.

7. The shifter of claim 6, wherein said spring is a leaf spring of spring steel operatively arranged for resting under preload against said driver and urging said driver against said retaining profile.

8. The shifter of claim 6, wherein said pawl comprises a leaf spring of spring steel connected to said movable element.

9. The shifter of claim 6, wherein a connection between said pawl and said movable element is a positive, form-locking connection.

10. The shifter of claim 6, further comprising a one-part spring element connected to said movable element in a positive, form-locking connection, wherein said pawl and said spring comprise integral portions of said one-part spring element.

11. The shifter of claim 9, wherein said movable element includes a retaining rib operatively arranged to form a groove with said movable element in which at least a part of said pawl is arranged.

12. The shifter of claim 10, wherein said movable element includes a retaining rib operatively arranged to form a groove with said movable element in which said spring element is arranged.

* * * * *